C. B. WOLCOTT.
JACK.
APPLICATION FILED AUG. 21, 1916.
1,211,652. Patented Jan. 9, 1917.
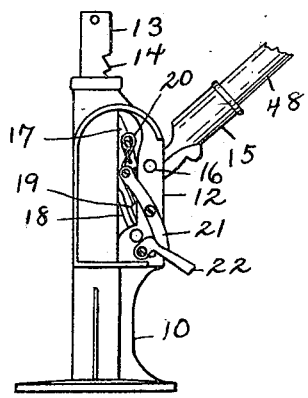
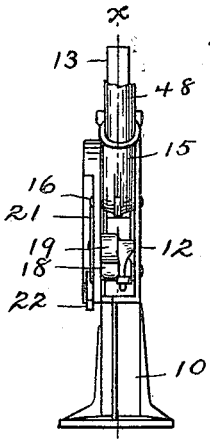
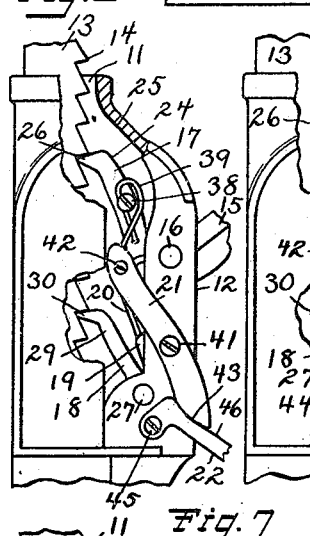
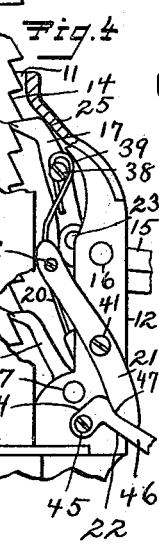
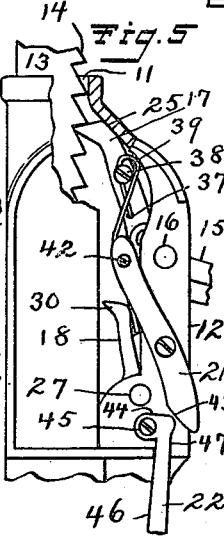
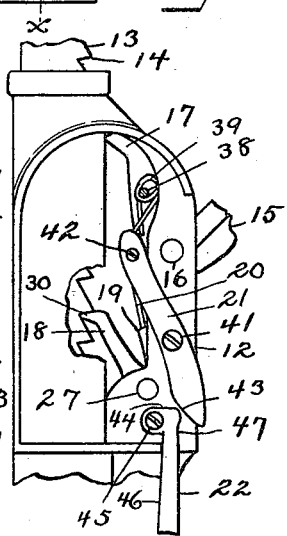
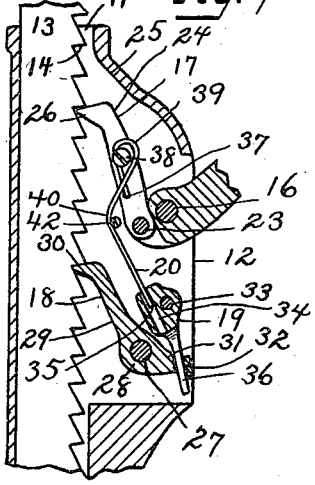
Inventor:
Charles Brewer Wolcott.
By Louis M. Schmidt
Atty.

UNITED STATES PATENT OFFICE.

CHARLES BREWER WOLCOTT, OF WEST CHESHIRE, CONNECTICUT.

JACK.

1,211,652.  Specification of Letters Patent.  Patented Jan. 9, 1917.

Application filed August 21, 1916. Serial No. 116,079.

*To all whom it may concern:*

Be it known that I, CHARLES BREWER WOLCOTT, a citizen of the United States, residing at West Cheshire, in the county of New Haven and State of Connecticut, have invented certain new and useful Improvements in Jacks, of which the following is a specification.

My invention relates to improvements in jacks, of the class used for automobiles, and suitable for use with other vehicles, and the object of my improvement is simplicity and economy in construction and convenience and efficiency in use.

In the accompanying drawing:—Figure 1 is a side elevation of my improved jack. Fig. 2 is a rear elevation of the same. Figs. 3, 4, 5 and 6 are side elevations on an enlarged scale of certain parts shown in Fig. 1. Fig. 7 is a sectional view on the line $x$ $x$ of Fig. 2.

My improved jack comprises a standard 10 having an elongated vertical slot 11 and a body portion 12 near the upper end forming a casing for the operating mechanism, a stem 13 operatively housed in the said slot 11 and having a set of teeth 14 on the rear face, constituting a rack, a lever 15 pivotally connected to the rear portion of the casing 12 by a pivotal pin 16, and the said operating mechanism for operatively connecting the said lever 15 with the said stem 13 whereby when the lever is oscillated on its pivot the stem is either raised or lowered. The said mechanism comprises a pair of dogs, respectively an upper dog 17 and a lower dog 18, each having a tooth at the upper end for engaging with the rack 14, a block 19, a spring 20, and a shifting device composed of a shifting bar 21 and a latch 22.

The upper dog 17 is pivotally connected to the front end of the lever 15 by means of a pivotal pin 23, adjacent the pivotal pin 16, the said end of the lever being preferably forked for providing a housing for the lower end portion of the said dog 17. The rear face 24 of the upper end of the dog 17 is in the form of a cam surface for coöperating with the opposed face 25 of the upper rear wall of the casing 12 whereby when the lever 15 is moved so as to elevate the upper dog 17 the tooth 26 on the front face will be directed inwardly so as to engage with the rack 14. The lower dog 18 is positioned appreciably below the upper dog 17 and is pivotally supported from the side walls of the casing 12 by means of a shaft 27 extending through the hub portion 28. Extending upwardly from the hub portion 28 is an arm 29 having at the upper end the tooth 30 for engaging with the rack 14, and extending generally rearwardly from the said hub portion 28 is a tail 31 having a generally vertically directed recess 32.

The block 19 is pivotally supported from the side walls of the casing 12 by means of a shaft 33, positioned generally between the pivotal pins or shafts 16 and 27, and slightly rearwardly relatively to the shaft 27 that supports the lower dog 18. The shaft 33 passes through the body portion of the block 19, and the said body portion is provided on the front side with a slot or bore 34, directed at a slight inclination, that is a loose fit for and suitable for housing the lower end 35 of the spring 20. The block 19 is furthermore provided with a finger 36 extending downwardly from the body portion through the recess 32 in the tail 31 and is an operative fit therein.

The spring 20 is formed of wire, has the upper end bent to one side and entered in a hole 37 in the middle portion of the upper dog 17, extends upwardly from the hole 37 to the screw 38 the end portion of which is screwed into the upper dog 17, is loosely coiled around the said screw 38 as shown at 39, the main portion 40 extending from the said screw 38 downwardly and terminating in the lower end portion 35 already mentioned, housed in the slot 34 in the block 19. The main portion 40 may be bent or bowed forwardly at about the middle, as shown, the lower end portion 35 being generally straight. The spring 20 as shown is positioned generally in a vertical plane, and at the left side of the upper dog 17.

The shifting bar 21 is pivotally supported from the left side wall of the casing 12, which side wall as shown is of skeleton construction to permit of access to the operating mechanism, being positioned in abutment with the outer face of the said side wall and supported by the pivotal screw 41, which is at the rear of the main part 40 of the spring 20. The upper portion of the shifting bar 21 extends upwardly and forwardly toward the middle, bowed portion of the main part 40 of the spring and at the upper end is provided with a laterally directed pin 42 that engages with the said main part 40 of the spring 20, on the rear side thereof. The lower portion of the shifting bar 21 extends downwardly and rearwardly from the pivotal support 41 and has on the lower front edge portion a cam surface 43 for coöperating with the latch 22.

The latch 22 is a lever of right-angled form, comprising a short forwardly directed branch 44, the front end of which is connected to the pivotal pin 45, and a handle branch 46 extending downwardly from the rear end of the upper branch 44, the rear edge portion 47 at the junction of the said branches being formed as a cam surface for coöperating with the cam surface 43 on the shifting bar 21. When the latch 22 is positioned with the handle arm 46 hanging downwardly, vertically the cam surfaces 43 and 47 are disengaged and the mechanism is adjusted for lowering the stem 13. In this position the pin 42 for engaging with the spring 20 is idle, being at the rearmost position, and although in contact with the spring, performs no active part, or function. When the handle 46 is raised the device is set for raising the stem 13 and the cam surfaces 43 and 47 lock the mechanism for such operation. In this position the pin 42 presses against the main part 40 of the spring, pushing the same forwardly, the said main part 40 operating essentially as an independent and complete spring, the bearing points comprising the screw 38 at the upper end and the slot 34 in the block 19 at the lower end portion 35. The operation of the said lower end portion 35 in the slot 34 is important and involves certain special features. In the setting mentioned for raising the stem 13 the bearing point for the spring is always above the shaft 33, and at the initial movement, the handle 48 of the lever 15 being raised, and the upper dog 17 being lowered so as to engage with a lower tooth, the lower dog 18 is resiliently engaged with the rack 14 and sustains the load. As the upper dog 17 engages with a lower tooth and is raised by the lever the stem 13 is raised in the slot 11.

The contact point of the spring 20 is above the shaft 33 for the position described, and the tendency is to always hold the lower dog 18 engaged. When set for lowering the stem 13 the entire spring 20 is active, the cam surfaces 24 and 25 are utilized, and also use is made of the feature of having the contact point of the spring end 35 pass from one side to the other of the neutral point in the slot 34. The lower dog 18 sustains the load while the upper dog 17 is shifted from a lower tooth to an upper tooth. The lower dog 18 is then freed, the load being dropped by the upper dog 17, and finally the lower dog 18 is brought into position to engage with an upper tooth. The spring 20 when in the lower position tends to move the lower dog 18 to the engaging position and to free the same when in the high position.

In Figs. 3 and 4 the device is set for raising the stem and in Figs. 5 and 6 it is set for lowering. In Fig. 3 the initial position for raising is shown and in Fig. 4 the final position, after the stem has been raised for the space corresponding to one tooth of the rack. In Fig. 5 the position is shown in which the lower dog is free, the load being carried by the upper dog. As the stem is lowered the lower dog is moved into engaging position by the spring, and after the load has been transferred to the lower dog the upper dog is free and disengaged by the spring, the parts assuming the position shown in Fig. 6.

I claim as my invention:—

1. A jack comprising a casing having a vertical slot, a stem housed in the said slot and having a rack on one face, a lever pivoted to the casing, an upper dog pivotally connected to the end of the lever and having a tooth for engaging with the said rack, a lower dog pivotally supported from the casing and having a tooth for engaging with the said rack, a block pivotally supported from the casing, having a finger operatively connected to the said lower dog, and having a slot in the body portion, and a spring supported by the said upper dog, having one end portion positioned in the said slot, and serving to position the said dogs relatively to the said rack.

2. A jack comprising a casing having a vertical slot, a stem housed in the said slot and having a rack on one face, a lever pivoted to the casing, an upper dog pivotally connected to the end of the lever and having a tooth for engaging with the said rack, a lower dog pivotally supported from the casing and having a tooth for engaging with the said rack, a block pivotally supported from the casing, having a finger operatively connected to the said lower dog, and having a slot in the body portion, a spring supported by the said upper dog and having one end portion positioned in the said slot, and a shifting device comprising a shifting bar, pivotally mounted on the casing, and having a pin for engaging with the portion of the said spring extending between the upper dog and the block.

3. A jack comprising a casing having a vertical slot, a stem housed in the said slot and having a rack on one face, a lever pivoted to the casing, an upper dog pivotally connected to the end of the lever and having a tooth for engaging with the said rack, a lower dog pivotally supported from the casing and having a tooth for engaging with the said rack, a block pivotally supported from the casing, having a finger operatively connected to the said lower dog, and having a slot in the body portion, a spring supported by the said upper dog and having one end portion positioned in the said slot, a shifting device comprising a shifting bar, pivotally mounted on the casing, and having a pin for engaging with the portion of the said spring extending between the upper dog and the block, and a latch for locking the said shifting bar in such position.

4. In a jack having a casing and a stem operatively mounted therein, an upper dog and a lower dog for engaging with the stem, a lever connected by one end to the said upper dog, the said lower dog being supported from the casing, a swinging block pivotally supported from the casing, operatively connected to the said lower dog, a spring carried by the said upper dog and having a part extending to the said block, the said block having a slot that is a loose fit for the said spring, the end portion of the said spring being positioned in the said slot suitably to make sliding and lateral bearing contact with the walls thereof, and the parts being so related that as the upper dog is raised and lowered by operating the said lever the contact position of the said spring with the said block will be shifted from one side to the other of the pivotal support for the said block.

5. In a jack having a casing, a stem provided with a rack operatively mounted thereon, mechanism coöperating with the said stem comprising a lever, an upper dog, a lower dog, and a spring, a pivotally mounted block serving as the connecting means between the said spring and the lower dog, the said block having a slot in which a part of the said spring is operatively housed, the said spring serving to position the said lower dog relatively to the said stem, the said lever having a limited oscillating movement and serving to raise and lower the said spring and thereby shift the bearing contact of the said spring with the said block and the pivotal support for the said block being so related to the said slot and spring that in one of the limited positions of the said lever the lower dog will be held in contact with the said stem and in the other of the said positions will be held away from the said stem.

CHARLES BREWER WOLCOTT.

Witnesses:
DANIEL E. O'KEEFE,
LOUIS M. SCHMIDT.

Copies of this patent may be obtained for five cents each, by addressing the "Commissioner of Patents, Washington, D. C."